United States Patent [19]

Ichikawa et al.

[11] 3,920,734

[45] Nov. 18, 1975

[54] PROCESS FOR THE PREPARATION OF AROMATIC CARBOXYLIC ACIDS

[75] Inventors: Yataro Ichikawa; Teizo Yamaji, both of Iwankuni, Japan

[73] Assignee: Teijin Limited, Osaka, Japan

[22] Filed: Aug. 7, 1973

[21] Appl. No.: 386,432

[30] Foreign Application Priority Data

Aug. 10, 1972 Japan..............................47-79434

[52] U.S. Cl...... 260/515 R; 260/465 D; 260/475 R; 260/514.5; 260/515 A; 260/515 P; 260/516; 260/520

[51] Int. Cl......................... C07c 63/06; C07c 63/38

[58] Field of Search...................... 260/515 A, 515 R

[56] References Cited
UNITED STATES PATENTS 3,578,716   5/1971   Robinson............................. 260/515

3,700,729   10/1972   Fenton................................ 260/515

*Primary Examiner*—James A. Patten
*Attorney, Agent, or Firm*—Leonard W. Sherman

[57] ABSTRACT

A process for preparing aromatic carboxylic acids which comprises contacting an aromatic compound having at least one hydrogen atom attached to a nuclear carbon atom, with carbon monoxide and a member selected from the group consisting of molecular oxygen and a molecular oxygen-containing gas, in the presence of a palladium carboxylate as catalyst.

14 Claims, No Drawings

PROCESS FOR THE PREPARATION OF AROMATIC CARBOXYLIC ACIDS

This invention relates to a process for preparing aromatic carboxylic acids. More particularly, this invention relates to a process for preparing the aromatic carboxylic acids in a single stage by reacting an aromatic compound having at least one hydrogen atom attached directly to the nuclear carbon atoms, with carbon monoxide and molecular oxygen in the presence of a catalyst consisting of a palladium carboxylate.

As methods of preparing aromatic carboxylic acids, various methods such as the followings have been known to date.

1. The method wherein the alkyl-substituted aromatic compounds are oxidized to convert the alkyl group to carboxyl group (J. A. C. S. 71 (1949), U.S. Pat. No. 2,833,816 (1958)).

2. The method wherein a Friedel-Crafts catalyst or a strong acid catalyst as used in the Gattermann-Koch reaction is used in a stoichiometric amount, and an aromatic compound is treated with carbon monoxide to prepare an aromatic aldehyde, following which this is oxidized to form an aromatic carboxylic acid (Ber. 30 1622 (1897)).

3. The method wherein an aromatic compound is halogenated, and thereafter the halogenated product is reacted with carbon monoxide to prepare an aromatic carboxylic acid (J. A. C. S. 70 854 (1948), U.S. Pat. No. 2,565,461).

4. The method wherein a hydroxy-substituted aromatic compound such as phenol is submitted to the Kolbe-Schmitt reaction to prepare a hydroxyaromatic carboxylic acid (Ann. 113 125 (1860), B.P. 942418 (1963)).

In the case of the methods such as hereinabove described, while the method of (1) is one that is being practiced commercially on a large scale, there is required in this case the use as the starting material of an aromatic compound which has in anticipation either an alkyl or similar group such, for example, as hydroxyalkyl or aldehyde, in a position corresponding to the carboxyl group that is to be possessed by the final product. In the case of the method of (2) a catalyst which is strongly corrosive is required. Again, difficulty is involved in separating in a stoichiometric amount the resulting aldehyde from the catalyst used. Hence, this method is not being practiced commercially at the present time. The method of (3) requires a two-stage reaction, i.e., the halogenation reaction and that of forming the carboxylic acid, and thus is not economical. In addition, the consumption of a halogen makes for its undesirability. Hence, this method also is not being practiced commercially. The method of (4) is a method that is being practiced commercially in preparing salicylic acid and p-hydroxybenzoic acid. However, since the starting material is limited to the hydroxy aromatic compounds, it cannot be regarded as being a method that can be applied generally.

As a method of directly introducing the carboxyl group to the aromatics, there has been proposed a method which comprises reacting an aromatic compound with carbon monoxide and oxygen or an oxygen-containing gas in the presence of a catalyst consisting of iodine and one or more compounds selected from the group consisting of iron chloride, vanadium chloride and platinum chloride (*Chemical Abstracts* 69 P 106270C (1968)).

This method uses as its catalyst the corrosive iodine and heavy metal halides and, in addition, in the case of the specific method disclosed, the reaction must be carried out under harsh conditions of a pressure of 80–105 kg/cm$^2$ and a temperature of 200°–250°C. Hence, this method cannot be regarded as being a commercially advantageous method.

Thus, as above noted, a commercially advantageous method of preparing the aromatic carboxylic acids by directly introducing the carboxyl group has not yet been proposed to date.

It is therefore an object of the present invention to provide a commercially advantageous process for perparing aromatic carboxylic acids from aromatic compounds by means of a single-stage reaction without using such corrosive materials as iodine and the heavy metal halides.

Another object of this invention is to provide a new catalyst for converting the aromatic compounds directly to the aromatic carboxylic acids by reacting the former with carbon monoxide and molecular oxygen.

Other objects and advantages of the invention will become apparent from the following description.

The foregoing objects and advantages of the present invention are achieved according to the invention by reacting an aromatic compound with carbon monoxide and a molecular oxygen-containing gas, using as a catalyst a palladium carboxylate.

According to this invention, an aromatic compound having at least one hydrogen atom directly attached to the nuclear carbon atoms is contacted with carbon monoxide and a molecular oxygen-containing gas in the presence of a palladium carboxylate to prepare an aromatic carboxylic acid.

Any of the aromatic compounds, whether monocyclic, polycyclic, or of the condensed ring type, will do as the starting material to be used in the present invention, so long as it is an aromatic compound having at least one hydrogen atom directly attached to a carbon atom making up the aromatic ring. Further, these aromatic compounds may have substituent groups that do not impair the reaction. As these aromatic compounds, mention can be made of the following:

A. Monocyclic aromatic compounds, for example, benzene and its substituted derivatives.
B. Polycyclic aromatic compounds, for example, biphenyl, biphenyl ether, terphenyl, quaterphenyl and the substituted derivatives thereof.
C. Condensed ring aromatic compounds, for example, naphthalene, anthracene, phenanthrene and the substituted derivatives thereof.

As the substituent groups making up the substituted products of these various aromatic compounds, for excample, those indicated in (a) – (i), below, can be named.

a. Alkyl groups or alicyclic hydrocarbon residues
   Alkyl groups of 1 – 4 carbon atoms, preferably the alkyl groups of 1 – 3 carbon atoms, for example, methyl, ethyl, n- or iso-butyl and n-, iso or tert.-butyl groups. The alicyclic hydrocarbon residues of 1 – 10 carbon atoms, for example, cyclohexyl, methylcyclohexyl, dimethylcyclohexyl, ethylcyclohexyl and propylcyclohexyl groups.

b. Hydroxyalkyl groups

Alkyl groups or alicyclic hydrocarbon residues, as given in (a), above, having a hydroxy substituent group, for example, hydroxymethyl and hydroxyethyl groups.

c. Alkoxy group

Alkoxy groups having an alkyl group given in (a), above, for example, methoxy and ethoxy groups.

d. Carboxyl group and the esters thereof

Esters of the alkyls or alicyclic hydrocarbon residues mentioned in (a), of the carboxyl group, for example, —COOH, —COOCH₃, —COOC₂H₅, —COOC₃H₇ and —COOC₄H₉.

e. Cyano group
f. Nitro group
g. Formyl group
h. Halogens

For example, fluorine and chlorine.

i. Acyl groups

Groups of the formula RCO, where R is a hydrocarbon residue having 1 – 10 carbon atoms, and preferably 1 – 8 carbon atoms, for example, acetyl, propionyl and benzoyl groups.

j. Groups obtained by substituting at least one of the foregoing substituent groups (b) – (h) for the hydrogen of the alkyl groups or alicyclic hydrocarbon residues of (a), above.

As these aromatic compounds to be used in the present invention, especially useful are those of the following formulas (1), (2), (3) and (4).

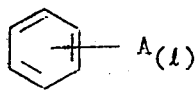  (1)

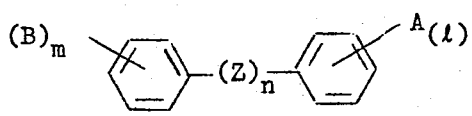  (2)

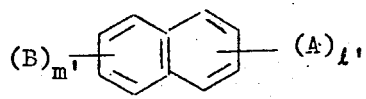  (3)

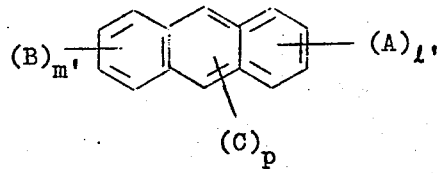  (4)

wherein A, B and C, which may be the same or different, each represent a substituent aroup given in (a)–(j), above, and *l* and *m*, which may be the same or different, each represent a positive integer of 0 – 4, preferably 0 – 3, and when *l* or *m* is 0, A or B is hydrogen. Further, in formula (2), Z represents a group selected from the class consisting of —O—, —O—(CH₂)—$_q$O— (where *q* is an integer of 1 – 3), —S—, —SO₂—,

and a phenylene group of o-, m- or p-orientation (where the phenylene group may contain 1 – 3 of the aforementioned (a)–(j) substituent groups); *n* represents 0 or 1, and when *n* is 0, formula (2) represents either a substituted or unsubstituted biphenyl; and *p* is an integer of 0–2; *l'* and *m'*, which may be the same or different, each represents a positive integer of 0–4, preferably 0–3.

The following compounds more specifically exemplify the compounds of the foregoing formulas (1)–(4) that can be used as the starting material of the present invention.

1. Aromatic compounds

For example, benzene, toluene, xylene (o,m, p), ethylbenzene, cumene, trimethylbenzenes, tetramethylbenzene, naphthalene, alpha- or beta-methylnaphthalene, dimethylnaphthalenes, ethylnaphthalene, anthracene, phenanthrene, biphenyl, 4-methylbiphenyl, 3-methylbiphenyl and 3,3-dimethylbiphenyl.

2. Aromatic Carboxylic Acids or the Esters Thereof

For example, benzoic acid, methyl benzoate, ethyl benzoate, toluic acid (o, m, p), toluic acid methyl ester (o, m, p), alpha-naphthoic acid, beta-naphthoic acid, methyl-alpha-naphthoic acids, methyl-beta-naphthoic acids, alpha-naphthoic acid methyl ester, beta-naphthoic acid methyl ester, alpha-naphthoic acid ethyl ester, beta-naphthoic acid ethyl ester and diphenylmonocarboxylic acid (2-, 3- or 4-) or the methyl, ethyl, propyl and butyl esters thereof.

3. Aromatic Esters

For example, anisole, diphenyl ether, diphenyl ether carboxylic acid, 1,2-diphenylethane,

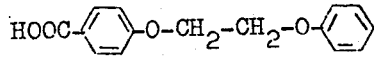

or the esters thereof.

4. Other Aromatic Compounds

For example, monochlorobenzene, dichlorobenzene, chloronaphthalene, benzonitrile, tolunitrile, cyanonaphthalene, nitrobenzene and acetophenone.

As the palladium carboxylate to be used as the catalyst in the present invention, any in which palladium is bonded to at least one carboxyl residue will do.

Included as these palladium carboxylates are the carbonate or organic carboxylic acid salts of palladium (Pd), especially preferred being the organic carboxylic acid salts. These organic carboxylic acid salts may have a substituent group which does not adversely affect the invention reaction; for example, they may have such substituent groups as those mentioned in (b)–(j), above, as substituent groups of the aromatic compounds, the starting material.

As these organic carboxylic acid salts, any will do so long as they are at least partly soluble in the reaction mixture (or reaction system) used in practicing the invention. However, generally speaking, conveniently used are those palladium salts of saturated or unsaturated organic carboxylic acids of 1–30 carbon atoms, and preferably 2–30 carbon atoms. Further, as these organic carboxylic acids, any will do, including the mono or poly acids, preferred being the organic mono to tri carboxylic acids.

As desirable organic carboxylic acids that are advantageously usable with palladium in forming the palladium carboxylates, mention can be made of the aliphatic monocarboxylic acids of 2–20 carbon atoms; the aliphatic di or tricarboxylic acids of 3–20 carbon atoms; the alicyclic carboxylic acids of 6–20 carbon atoms; and the aromatic mono- or polycarboxylic acids of 6–20 carbon atoms, e.g., benzene mono- or dicarboxylic acid and naphthalene mono- or dicarboxylic acid. Specific examples include such as acetic acid, propionic acid, stearic acid, malonic acid, succinic acid, adipic acid, cyclohexanecarboxylic acid, naphthenic acid, benzoic acid, toluic acid, alpha-naphthoic acid and beta-naphthoic acid. Particularly to be preferred are the aliphatic monocarboxylic acids of 2–4 carbon atoms.

In this invention, the foregoing palladium carboxylates may be added as such to the reaction system, or it is also possible to form these palladium carboxylates in the reaction system. For instance, the palladium carboxylate can be formed in the reaction system by adding to the reaction system an inorganic acid salt of palladium such, for example, as palladium chloride or palladium bromide and either an alkali metal salt or an alkaline earth metal salt of, say, an organic carboxylic acid such as mentioned hereinabove. Alternately, the palladium carboxylate can be formed in the reaction system by adding thereto an inorganic acid of palladium such as palladium nitrate and the aforementioned organic carboxylic acid.

While there is imposed no particular restriction as to the lower limit of the amount in which the aforesaid palladium carboxylate catalyst is used, usually an amount of at least 0.00001 mol and preferably at least 0.0001 mol, per mol of the starting aromatic compound will do. Further, there is imposed no particular restriction as to the upper limit of the catalyst used so long as it is an amount that does not adversely affect the operation of the reaction, say, the stirring operation. However, in actual operation the use of the catalyst in an amount of not more than 100 mols per mol of the starting aromatic compound will do, an amount in the range of 0.0001–50 mols, and particularly 0.001–10 mols, being particularly convenient.

While there is no special need to use a solvent in carrying out the invention process when the starting material is in a liquid state in the reaction system, the reaction can be carried out in a medium which is liquid under the reaction conditions and moreover does not have an adverse effect on the reaction.

As such a liquid medium, preferably used are the following:

i. Organic Carboxylic Acids

Organic carboxylic acids which are liquid under the reaction conditions of the present invention such as acetic acid, propionic acid, butyric acid and benzoic acid.

ii. Carboxylic Acid Anhydrides

Organic carboxylic acid anhydrides which are liquid under the reaction conditions of the present invention such as acetic anhydride, propionic anhydride, butyric anhydride, phthalic anhydride and succinic anhydride.

iii. Carboxylic Acid Esters

Alkyl esters of organic carboxylic acids such as methyl acetate, ethyl acetate, propyl acetate, methyl propionate, ethyl propionate, methyl butyrate, ethyl butyrate, methyl benzoate and ethyl benzoate.

iv. Ethers

Ethers which are liquid under the conditions of the present invention such as ethyl ether, tetrahydrofuran, dioxane, glyme and diglyme.

v. Ketones

For example, acetone, methyl ethyl ketone, methyl isobutyl ketone and cyclohexane.

vi. Alcohols

Lower alcohols such as methanol, ethanol, butanol, isopropanol and ethylene glycol.

vii. Nitriles

For example, acetonitrile and propionitrile.

viii. Organic halides

For example, chloroform, carbon tetrachloride, ethylene dichloride and perchloroethylene.

ix. Aliphatic or Alicyclic Hydrocarbons

Hydrocarbons which are liquid under the reaction conditions of the present invention, for example, butane, hexane, heptane, octane, cyclohexane, methylcyclohexane, petroleum ether and ligroin.

The foregoing media have been given merely as examples, and it is to be understood that the media are not limited in any way to those given above. Further, the foregoing media can be used either singly or in combination of two or more thereof. In using such media, their use in any amount will do, provided it is at least an amount (inclusive of forming a slurry) which ensures the fluidity of the reaction system.

The carbon monoxide and the molecular oxygen-containing gas used in the invention process may be introduced either separately or as a mixture. Again, while as the gas to be used in the reaction one consisting essentially of carbon monoxide and molecular oxygen will do, it may also contain other gases that do not adversely affect the reaction.

Such other gases include nitrogen, carbon dioxide, the lower hydrocarbons such as methane and ethane, and hydrogen, helium and argon. As a readily available source of carbon monoxide, water gas is especially preferred, and as the source of molecular oxygen, air is readily available.

While there is no particular restriction as regards the composition of the carbon monoxide (CO) and the molecular oxygen ($O_2$) in the reaction system, suitably used is a molar ratio of $CO:O_2$ in the range of 1:99–99:1, preferably 10:90–90:1, and more preferably 20:80–80:20. However, a molar ratio of $CO/O_2$ in the range of 0.5/1–3/1 is especially advantageous.

The reaction pressure to be employed in practicing the invention may be a reduced pressure, a normal atmospheric pressure or a superatmospheric pressure, usually used is one ranging from normal atmospheric pressure to 300 atmospheres, preferably normal atmospheric pressure to 200 atmospheres, and more preferably 2 atmospheres to 100 atmospheres.

Further, while there is imposed no particular restriction as to the partial pressures of the carbon monoxide and the molecular oxygen in the reaction system, a partial pressure for the carbon monoxide as well as that for the molecular oxygen of usually at least 0.1 atmosphere, and preferably at least 0.5 atmosphere, is suitable.

The reaction temperature desirably employed in the invention process is that in the range of 0°–300°C., preferably 30°–250°C., and more preferably 50°–200°C. The reaction time will vary depending upon the reaction conditions, but one ranging from 1 minute to 100 hours, and preferably 1 hour to 50 hours, is desirably used.

While the reaction of the present invention is represented typically by the following equation

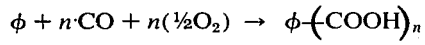

wherein $\phi$ is an aromatic compound, which may have a substituent group, and $n$ is a positive integer not less than 1, it appears according to our research that when the starting material aromatic compound is submitted to the reaction of the present invention, first, a single carboxyl group is introduced principally into said aromatic compound and thereafter with the passage of the reaction time two or more carboxyl groups are gradually introduced into the aromatic compound. Hence, according to the present invention, it is possible to form from the aromatic compound not containing carboxyl groups, such as benzene, toluene and naphthalene, the respective monocarboxylic acids of these compounds, or in a single stroke the di-, tri- or polycarboxylic acids of greater carboxyl numbers. Further, in accordance with the invention, a separately formed aromatic carboxylic acid or that formed by the invention process (e.g., benzoic or naphthoic acid) can be formed into an aromatic polycarboxylic acid of greater carboxyl number (e.g., isophthalic and/or terephthalic acid or naphthalenedicarboxylic acid) by the application of the invention process.

According to the invention, when the invention process is carried out using, say, benzene as the starting material, first, benzoic acid is principally formed during the initial stages of the reaction and, with the passage of the reaction time, an isophthalic acid-terephthalic acid mixture containing a greater amount of isophthalic acid is formed. Again, when the invention process is applied to benzoic acid, a mixture of isophthalic acid and terephthalic acid containing the former in a greater amount is formed.

On the other hand, when the present invention is practiced using naphthalene as the starting material, first, a beta-naphthoic acid mixture containing a greater amount of beta-naphthoic acid is formed in a high proportion, but when the reaction time is prolonged, a predominantly 2,6- and 2,7-naphthalendicarboxylic acid mixture containing the former in a higher proportion is formed as the principal reaction product.

Thus, in accordance with the present invention, when the invention process is carried out using as the starting material either a monocarboxyl-substituted aromatic compound or an aromatic compound containing a condensed ring, in general, a reaction in which the carboxyl group is substituted for the hydrogen atoms attached to the nuclear carbon atom in the beta and gamma positions proceeds principally, and, in particular, there is noted a tendency of the reaction in which the substitution of the carboxyl group for the carbon atom in the beta position to proceed with greater predominance.

Thus, it becomes possible by the practice of the process of the present invention to introduce either one, two or more carboxyl groups to the aromatic compounds, with the consequence that aromatic mono-, di- or polycarboxylic acids of greater carboxyl numbers can be obtained in a single stage.

The following nonlimitative examples will be given for more fully illustrating the invention.

EXAMPLE 1

A stainless steel autoclave having a capacity of 100 volume parts and equipped with a magnetic stirrer was charged with 5.12 parts of naphthalene, 1.12 parts of palladium acetate [Pd(AcO)$_2$] and 50 parts by volume of acetic acid. The reaction pressure was then adjusted to a pressure indicated in the following Table 1 with a gaseous mixture of oxygen and carbon monoxide of varying ratio as indicated therein, after which the reaction was carried out at a reaction temperature and for a reaction time indicated in said table. After completion of the reaction, the reaction product was analyzed by means of gas chromatography with the results shown in Table 1.

Table 1

| Run No. | O$_2$:CO Ratio | Reaction pressure (kg/cm$^2$G) | Reaction temperature (°C) | Reaction time (hr) | Naphthalene conversion (%) | Naphthoic acid Yield (part) | Selectivity for naphthoic acid (%) | $\alpha$:$\beta$ ratio in naphthoic acid |
|---|---|---|---|---|---|---|---|---|
| 1-a | 50:50 | 10 | 90 | 5 | 16 | 1.10 | 53 | 20:80 |
| 1-b | 34:66 | 0 | 75 | 9.5 | 9 | 0.30 | 50 | 11:89 |
| 1-c | 50:50 | 20 | 90 | 5 | 8.6 | 0.54 | 92 | 37:63 |
| 1-d | 50:50 | 40 | 90 | 5 | 2.5 | 0.126 | 73 | 53:47 |
| 1-e | 50:50 | 10 | 180 | 1 | 11.3 | 0.35 | 45 | 18:82 |
| 1-f | 50:50 | 0 | 60 | 7.5 | 9.0 | 0.041 | 30 | 49:51 |
| 1-g | 80:20 | 10 | 90 | 5 | 9.2 | 0.20 | 31 | 12:88 |
| 1-h | 13:87 | 10 | 90 | 5 | 1.5 | 0.100 | 97 | 47:53 |
| 1-i* | 50:50 | 10 | 90 | 5 | 1.2 | 0.053 | 64 | 15:85 |
| 1-j | 50:50 | 10 | 30 | 30 | | | | |

*0.112 Part of Pd(AcO)$_2$ was used.

EXAMPLE 2

An autoclave of the same type as used in Example 1 was charged with 5.12 parts of naphthalene, a palladium carboxylate indicated in the following Table 2, and 50 parts by volume of acetic acid, after which the reaction pressure was adjusted to 10 kg/cm$^2$ gauge with a gaseous mixture (50:50) of oxygen and carbon monoxide, and the reaction was carried out for 5 hours at a reaction temperature of 90°C. The results obtained are shown in Table 2, below.

Table 2

| Run No. | Class of palladium carboxylate (part) | Naphthalene conversion (%) | Naphthoic acid Yield (part) | Selectivity for naphthoic acid (%) | α:β ratio in naphthoic acid |
| --- | --- | --- | --- | --- | --- |
| 2-a | Palladium benzoate (1.74) | 13.7 | 0.57 | 60 | 18:82 |
| 2-b | Palladium propionate (1.262) | 0.4 | 0.0183 | 67 | 19:81 |
| 2-c | Palladium monochloroacetate (0.825) | 3.2 | 0.143 | 65 | 40:60 |
| 2-d | Palladium stearate (3.36) | | | | |
| 2-e | Palladium phenylacetate (1.88) | 5.4 | 0.290 | 78 | 35:65 |

EXAMPLE 3

The experiment was carried out by operating as in Run No. 1 of Example 1, except that instead of acetic acid one of the various solvent indicated in Table 3, below, was used as the solvent, and the reaction was carried out under the conditions indicated in said Table 3. The results obtained are shown in Table 3.

The reaction was then carried out by varying not only the reaction pressure with a 50:50 gaseous mixture of oxygen and carbon monoxide but also the reaction temperature and reaction time as shown in said Table 4. When the reaction product was analyzed by means of gas chromatography after completion of the reaction, it was found that in each case the corresponding carboxylic acids were obtained as shown in Table 4.

Table 3

| Run No. | Class of solvent (part) | $O_2$:CO ratio | Reaction pressure (kg/cm²G) | Reaction temperature (°C) | Reaction time (hr) | Naphthalene conversion (%) | Naphthoic acid Yield (part) | Selectivity for naphthoic acid (%) | α:β ratio in naphthoic acid |
| --- | --- | --- | --- | --- | --- | --- | --- | --- | --- |
| 3-a | Propionic acid (50) | 50:50 | 10 | 90 | 5 | 2 | 0.124 | 90 | 22:78 |
| 3-b | Acetic anhydride (50) | do. | 10 | 90 | 5 | 0.1 | 0.004 | 67 | 28:72 |
| 3-c | Carbon tetrachloride (50) | do. | 10 | 90 | 5 | 7.4 | 0.407 | 80 | 53:47 |
| 3-d | Acetone (50) | do. | 10 | 90 | 5 | 0.1 | 0.003 | 62 | 41:59 |
| 3-e | Acetic acid (45) + methanol (5) | do. | 10 | 90 | 5 | 0.1 | 0.049 | 96 | 43:57 |
| 3-f | Acetonitride | do. | 10 | 100 | 5 | 1.2 | 0.033 | 40 | 48:52 |
| 3-g | Butyl acetate | do. | 10 | 100 | 5 | 2.6 | 0.150 | 84 | 50:50 |
| 3-h | Tetrahydrofuran | do. | 10 | 100 | 5 | 1.5 | 0.077 | 75 | 30:70 |
| 3-i | Methyl monochoroacetate | do. | 10 | 100 | 5 | 4.5 | 0.266 | 86 | 45:55 |

Table 4

| Run No. | Starting material (part) | Solvent (vol. part) | Reaction pressure (kg/cm²G) | Reaction temperature (°C) | Reaction time (hr) | Conversion (%) | Total selectivity for acid (%) | Ratio of acids formed (%) |
| --- | --- | --- | --- | --- | --- | --- | --- | --- |
| 4-a | Benzoic acid (4.88) | acetic acid (50) | 10 | 90 | 5 | 4.4 | 82 | isophthalic acid: terephthalic acid 95:5 |
| 4-b | Benzonitrile (5.0) | acetic acid (50) | 10 | 90 | 5 | 5.12 | 65 | p-cyanobenzoic acid: m-cyanobenzoic acid 50:50 |
| 4-c | Diphenyl (6.16) | acetic acid (50) | 10 | 90 | 5 | 7.9 | 87 | diphenyl-4-carboxylic acid 44 diphenyl-3-carboxylic acid 56 |
| 4-d | Diphenyl ether (6.80) | acetic acid (50) | 10 | 90 | 5 | 15.8 | 81 | diphenylether-4-carboxylic acid 60 diphenylether-3-carboxylic acid 40 |
| 4-e | Naphthoic acid methyl ester (3.40) | acetic acid (50) | 10 | 90 | 5 | 0.1 | 65 | 2,6-naphthalenedicarboxylic acid monomethyl ester 70 2,7-naphthalenedicarboxylic acid monomethyl ester 30 |
| 4-f | Anthracene (4.46) | perchloroethylene (30) | 20 | 100 | 4 | 32.3 | 60 | anthracene-9-carboxylic acid 50 |
| 4-g | Phthalic acid (8.30) | perchloroethylene (30) | 20 | 140 | 4 | 1.3 | 50 | predominantly trimellitic acid |
| 4-h | Isophthalic acid (8.30) | perchloroethylene (30) | 20 | 140 | 4 | 1.5 | 53 | predominantly trimesic acid |

EXAMPLE 4

A stainless steel autoclave having a capacity of 100 volume parts and equipped with a magnetic stirrer was charged with 1.12 parts of palladium acetate, 50 parts by volume of acetic acid and the starting material, which was varied as indicated in the following Table 4.

EXAMPLE 5

Using as the starting material beta-naphthoic acid and as the catalyst 1.12 parts of palladium acetate [Pd(AcO)$_2$], naphthalenedicarboxylic acid was reacted in a stainless steel autoclave having a capacity of 100 volume parts and equppped with a magnetic stirrer, under the various conditions indicated in the following table. On analysis of the reaction product by means of gas chromatography, the following results were obtained.

Table 5

| Run No. | β-naphthoic acid (wt. part) | Solvent (part) | Gas composition ($CO:O_2$) | Reaction pressure ($kg/cm^2 G$) | Reaction temperature (°C) | Reaction time (hr) | Naphthalene dicarboxylic acid (wt. part) | Content of 2,6-naphthalene-dicarboxylic acid in naphthalenedicarboxylic acid (%) |
| --- | --- | --- | --- | --- | --- | --- | --- | --- |
| 5-a | 7.4 | acetic acid (50) | 50:50 | 10 | 90 | 5 | 0.010 | 90 |
| 5-b | 1.72 | perchloro-ethylene (50) | 50:50 | 10 | 110 | 6 | 0.774 | 88 |
| 5-c | 1.72 | perchloro-ethylene (50) | 70:30 | 10 | 135 | 6 | 0.565 | 85 |
| 5-d | 1.72 | perchloro-ethylene (50) | 50:50 | 5 | 120 | 6 | 0.462 | 91 |
| 5-e | 1.72 | n-hexane (50) | 50:50 | 10 | 110 | 6 | 0.120 | 80 |
| 5-f | 1.72 | acetic acid (50) | 50:50 | 40 | 105 | 6 | 0.153 | 83 |

EXAMPLE 6

The starting material and catalyst such as indicated in Table 6 were charged to a stainless steel autoclave having a capacity of 100 volume parts and equipped with a magnetic stirrer. The reaction was then carried out with a gaseous mixture of oxygen and carbon monoxide under the conditions indicated in Table 6, without using a solvent. The results obtained are shown in Table 6, below.

Table 6

| Run No. | Starting material (part) | Catalyst (part) | Gas composition ($CO:O_2$) | Reaction pressure ($kg/cm^2 G$) | Reaction temperature (°C) | Reaction time (hr) | Conversion (%) | Selectivity for acids (%) | Ratio of acids formed (%) |
| --- | --- | --- | --- | --- | --- | --- | --- | --- | --- |
| 6-a | benzene (10) | Pd(AcO)$_2$ 0.335 | 50:50 | 20 | 140 | 4 | 1.4 | 73 | benzoic acid (—100) |
| 6-b | toluene (5.1) | Pd(AcO)$_2$ 0.335 | 50:50 | 20 | 140 | 4 | 17 | 81 | toluic acid (O:m:p =43:20:37) |
| 6-c | anisole (10.8) | Pd(AcO)$_2$ 0.335 | 50:50 | 20 | 140 | 4 | 3.7 | 92 | anisic acid (O:p=53:47) |
| 6-d | chlorobenzene (5.7) | Pd(AcO)$_2$ 0.335 | 50:50 | 20 | 140 | 4 | 5.0 | 68 | m-chloro-benzoic acid (100) |
| 6-e | toluene (5.1) | Pd(AcO)$_2$ 0.335 | 50:50 | 20 | 160 | 4 | 8.5 | 60 | toluic acid (O:m:p =37:26:37) |
| 6-f | toluene (10.2) | Pd(HHBA)$_2$ 1.62 | 50:50 | 20 | 140 | 4 | 2.5 | 55 | toluic acid (O:m:p =40:52:8) |
| 6-g | toluene (10.2) | Pd(β-NA) 1.61 | 50:50 | 20 | 140 | 4 | 2.0 | 31 | toluic acid (O:m:p =24:68:8) |

HHBA = hexahydrobenzoic acid
β-NA = β-Naphthoic acid

What we claim is:

1. A process for preparing aromatic carboxylic acids which comprises contacting an aromatic compound having at least one hydrogen atom attached to a nuclear carbon atom, with carbon monoxide and a member selected from the group consisting of molecular oxygen and a molecular oxygen-containing gas, in the presence of a palladium carboxylate as a catalyst.

2. The process according to claim 1 wherein said contact is carried out at a temperature in the range of 0°–300°C.

3. The Process according to claim 2, wherein said contact is carried out at a temperature in the range of 30°–250°C.

4. The process according to claim 1 wherein a molar ratio of carbon monoxide (CO) to molecular oxygen ($O_2$) in the range of 10:90 to 90:10 is used.

5. The process according to claim 1 which comprises maintaining the partial pressure of the carbon monoxide (CO) as well as that of the molecular oxygen ($O_2$) at a pressure of at least 0.1 atmosphere.

6. The process according to claim 1 which comprises using as said palladium carboxylate a member selected from the group consisting of the carbonate and the organic carboxylates of palladium, said salts being at least partly soluble in the reaction mixture.

7. The process according to claim 1 which comprises using as said palladium carboxylate a palladium salt of an organic carboxylic acid, said organic carboxylic acid being an acid selected from the group consisting of the saturated and unsaturated organic carboxylic acids of 2–20 carbon atoms, said salt being at least partly soluble in the reaction mixture.

8. The process according to claim 1 wherein said palladium carboxylate is present in an amount ranging from at least 0.0001 mol to 50 mols per mol of said aromatic compound.

9. The process according to claim 1 wherein said aromatic compound is selected from the group consisting of naphthalene and naphthoic acid.

10. The process according to claim 1 wherein said contact is carried out in a medium which is selected from at least one of the group consisting of organic carboxylic acids, carboxylic acid anhydrides, carboxylic acid esters, ethers, ketones, alcohols, nitriles, organic halides, and aliphatic or alicyclic hydrocarbons; with the proviso that the medium is liquid under the reaction conditions and does not have an adverse effect on the reaction; said medium being present in an amount at least sufficient to form a slurry.

11. The process according to claim 8 wherein said palladium carboxylate catalyst is present in an amount ranging from 0.001 to 10 mols per mol of said aromatic compound.

12. The process according to claim 3 wherein said contact is carried out at a temperature in the range of 50°–200°C.

13. The process according to claim 5 wherein a partial pressure of at least 0.5 atmosphere is maintained.

14. The process according to claim 7 wherein the catalyst is the palladium salt of an aliphatic monocarboxylic acid having 2 to 4 carbon atoms.

* * * * *